(12) United States Patent
Hebert et al.

(10) Patent No.: US 11,223,672 B2
(45) Date of Patent: Jan. 11, 2022

(54) SYSTEM AND METHOD FOR USING A CONTAINER LOGIC STRUCTURE TO CONTROL COMPUTING OPERATIONS

(71) Applicant: Nimbix, Inc., Richardson, TX (US)

(72) Inventors: Stephen M. Hebert, Houston, TX (US); Robert L. Sherrard, McKinney, TX (US); Leonardo E. Reiter, Carrollton, TX (US)

(73) Assignee: AGARIK SAS, Saint-Ouen (FR)

(*) Notice: Subject to any disclaimer, the term of this patent is extended or adjusted under 35 U.S.C. 154(b) by 392 days.

(21) Appl. No.: 16/401,708

(22) Filed: May 2, 2019

(65) Prior Publication Data

US 2021/0289021 A1    Sep. 16, 2021

Related U.S. Application Data

(63) Continuation of application No. 16/285,928, filed on Feb. 26, 2019, now Pat. No. 11,064,014, which is a
(Continued)

(51) Int. Cl.
*H04L 29/08* (2006.01)
*G06F 9/48* (2006.01)
*G06F 9/50* (2006.01)

(52) U.S. Cl.
CPC ............ *H04L 67/10* (2013.01); *G06F 9/4843* (2013.01); *G06F 9/505* (2013.01); *G06F 2209/549* (2013.01)

(58) Field of Classification Search
None
See application file for complete search history.

(56) References Cited

U.S. PATENT DOCUMENTS 5,465,354 A   11/1995   Hirosawa et al.
5,579,527 A   11/1996   Chin et al.
(Continued)

FOREIGN PATENT DOCUMENTS

EP   2381363 A2   10/2011
EP   2381363 A3   10/2011
(Continued)

OTHER PUBLICATIONS

Margaret Rouse, Microsoft Azure (Windows Azure), Aug. 2018, WhatIs.com (Year: 2018).*
(Continued)

*Primary Examiner* — Brian Whipple
(74) *Attorney, Agent, or Firm* — Arc IP Law, PC; Joseph J. Mayo

(57) ABSTRACT

A method, system, and computer-readable storage medium for creating and executing containerized applications in cloud computing are disclosed. For example, one method involves identifying a command. Such a command indicates an application to be executed by a compute node. The method also involves generating a job for transmission to the compute node. The job indicates a container. The compute node, upon receipt of the job, is configured to create an environment for such a container, execute the application within the container, and generate results of the execution of the application.

20 Claims, 13 Drawing Sheets

Related U.S. Application Data continuation of application No. 15/917,395, filed on Mar. 9, 2018, now Pat. No. 10,616,312, which is a continuation of application No. 14/541,877, filed on Nov. 14, 2014, now Pat. No. 9,973,566.

(60) Provisional application No. 61/905,259, filed on Nov. 17, 2013.

(56) References Cited

U.S. PATENT DOCUMENTS

| | | | |
|---|---|---|---|
| 5,781,775 | A | 7/1998 | Ueno |
| 5,946,463 | A | 8/1999 | Carr et al. |
| 5,978,830 | A | 11/1999 | Nakaya et al. |
| 6,711,606 | B1 | 3/2004 | Leymann et al. |
| 7,299,466 | B2 | 11/2007 | Pulsipher et al. |
| 7,712,100 | B2 | 5/2010 | Fellenstein et al. |
| 7,827,273 | B2 | 11/2010 | Wilson et al. |
| 8,131,804 | B2 | 3/2012 | Greata et al. |
| 8,775,576 | B2 | 7/2014 | Hebert et al. |
| 8,869,164 | B2 | 10/2014 | Bobroff et al. |
| 9,094,404 | B2 | 7/2015 | Hebert et al. |
| 9,367,395 | B1 | 6/2016 | Bono et al. |
| 9,411,528 | B1 | 8/2016 | McGarry et al. |
| 9,411,613 | B1 | 8/2016 | McGarry et al. |
| 9,417,894 | B1 | 8/2016 | Giganti et al. |
| 9,531,580 | B1 * | 12/2016 | Seaman ............. G06F 21/6218 |
| 9,606,833 | B2 | 3/2017 | Vrind et al. |
| 2003/0042930 | A1 | 3/2003 | Pileggi et al. |
| 2003/0061566 | A1 * | 3/2003 | Rubstein ............. G06Q 30/02 715/201 |
| 2003/0154112 | A1 | 8/2003 | Neiman et al. |
| 2006/0036743 | A1 | 2/2006 | Deng et al. |
| 2006/0055956 | A1 | 3/2006 | Takahashi et al. |
| 2006/0206894 | A1 | 9/2006 | Jung et al. |
| 2007/0250365 | A1 | 10/2007 | Chakrabarti et al. |
| 2008/0066070 | A1 | 3/2008 | Markov |
| 2008/0133741 | A1 | 6/2008 | Kubota |
| 2008/0301685 | A1 | 12/2008 | Thomas et al. |
| 2009/0300635 | A1 | 12/2009 | Ferris |
| 2009/0319958 | A1 | 12/2009 | Li et al. |
| 2010/0042720 | A1 | 2/2010 | Stienhans et al. |
| 2010/0050172 | A1 | 2/2010 | Ferris |
| 2010/0268755 | A1 | 10/2010 | Arimilli et al. |
| 2010/0287553 | A1 | 11/2010 | Schmidt et al. |
| 2011/0106951 | A1 | 5/2011 | Akiyama et al. |
| 2011/0153727 | A1 | 6/2011 | Li |
| 2011/0231644 | A1 | 9/2011 | Ishebabi |
| 2011/0276977 | A1 | 11/2011 | van Velzen et al. |
| 2012/0005724 | A1 | 1/2012 | Lee |
| 2012/0023221 | A1 | 1/2012 | Dayan |
| 2012/0042000 | A1 | 2/2012 | Heins et al. |
| 2012/0042210 | A1 | 2/2012 | Glaser et al. |
| 2012/0047239 | A1 | 2/2012 | Donahue et al. |
| 2012/0054626 | A1 | 3/2012 | Odenheimer |
| 2012/0072578 | A1 * | 3/2012 | Alam ................. H04L 41/5009 709/224 |
| 2012/0072597 | A1 | 3/2012 | Teather et al. |
| 2012/0079490 | A1 | 3/2012 | Bond et al. |
| 2012/0131579 | A1 | 5/2012 | Pujolle et al. |
| 2012/0159523 | A1 | 6/2012 | Kulkarni et al. |
| 2012/0198229 | A1 | 8/2012 | Takashima |
| 2012/0226843 | A1 | 9/2012 | Lin et al. |
| 2012/0317579 | A1 | 12/2012 | Liu |
| 2013/0097651 | A1 | 4/2013 | Rendahl et al. |
| 2013/0103837 | A1 | 4/2013 | Krueger |
| 2013/0159380 | A1 * | 6/2013 | Alam ................. G06F 9/5072 709/203 |
| 2013/0205114 | A1 | 8/2013 | Badam et al. |
| 2013/0318240 | A1 | 11/2013 | Hebert et al. |
| 2014/0040883 | A1 | 2/2014 | Tompkins |
| 2014/0074932 | A1 | 3/2014 | Mihara et al. |
| 2014/0082156 | A1 * | 3/2014 | Jagtap ................. G06F 9/5027 709/220 |
| 2014/0181395 | A1 | 6/2014 | Vincent et al. |
| 2014/0365554 | A1 * | 12/2014 | Bleau .................. H04L 67/42 709/203 |
| 2015/0081764 | A1 | 3/2015 | Zhao et al. |
| 2015/0096011 | A1 | 4/2015 | Watt |
| 2015/0213011 | A1 | 7/2015 | George et al. |
| 2015/0261216 | A1 | 9/2015 | Yasuma et al. |
| 2015/0261517 | A1 | 9/2015 | Hodge et al. |
| 2015/0293793 | A1 | 10/2015 | Vrind et al. |
| 2016/0188877 | A1 | 6/2016 | Simha et al. |
| 2016/0299795 | A1 | 10/2016 | Kagami et al. |
| 2016/0314025 | A1 | 10/2016 | McGarry et al. |
| 2016/0335124 | A1 | 11/2016 | Baker et al. |

FOREIGN PATENT DOCUMENTS

| | | |
|---|---|---|
| EP | 3007061 | 4/2016 |
| WO | 2013/097902 | 7/2013 |

OTHER PUBLICATIONS

Goscinski, et al.. "Toward Dynamic and Attribute Based Publication, Discovery and Selection for Cloud Computing", Future Generations Computer Systems, Elsevier Publishers. Amsterdam, NL, vol. 26, No. 7, Apr. 14, 2010, pp. 947-970.

Lazouski, et al., "Usage Control in Cloud Systems", The 7th International Conference for Internet Technology and Secured Transactions, 2012 IEEE, pp. 202-207.

Hsiliev's Blog, "Running Existing Applications on SAP HANA Cloud," (dated Jun. 30, 2013), retrieved from the Internet: URL:hng:// hsilicv .blogsgot.nl/2013/06/running-cxisting-agglications-on-sag. htm l (retrieved Apr. 16, 2015), 8 pages.

Baxter, et al., "Maxwell—a 64 FPGA Supercomputer", Second NASA/ESA Conference on Adaptive Hardware and Systems (AHS), 2007, IEEE, 8 pages.

Chung, et al., "CoRAM: An In-Fabric Memory Architecture for FPGA-based Computing", Carnegie Mellon University, 2011, 10 pages.

Convey Computer Corporation, "The Convey HC-2 Computer— Architectural Overview," Convey White Paper, 2011-2012, 10pages.

George, et al., "Novo-G: At the Forefront of Scalable Reconfigurable Supercomputing", Jan./Feb. 2011 issue of IEEE Magazine— Computing in Science and Engineering, 4 pages.

Putnam, et al., "A Reconfigurable Fabric for Accelerating Large-Scale Datacenter Services", Catapult ISCA 2014, Microsoft, IEEE 2014, 12 pages.

Sato, et al., "Evaluating Reconfigurable Dataflow Computing Using the Himeno Benchmark", IEEE 2012, 7 pages.

So, et al., "A Unified Hardware/Software Runtime Environment for FPGA-Based Reconfigurable Computers Using BORPH", Department of Electrical Engineering and Computer Science—University of California, Berkeley, Oct. 22-25, 2006; pp. 259-264.

* cited by examiner

SYSTEM AND METHOD FOR USING A CONTAINER LOGIC STRUCTURE TO CONTROL COMPUTING OPERATIONS

RELATED APPLICATIONS

This non-provisional application is a continuation of U.S. patent application Ser. No. 16/285,928 filed Feb. 26, 2019, which is a continuation of U.S. patent application Ser. No. 15/917,395 filed Mar. 9, 2018, which is a continuation of U.S. patent application Ser. No. 14/541,877 filed Nov. 14, 2014 now issued as U.S. Pat. No. 9,973,566 on May 15, 2018, which claims benefit of and priority from U.S. Provisional Application Ser. No. 61/905,259 filed Nov. 17, 2013, which are hereby incorporated by reference.

FIELD OF THE INVENTION

This invention relates to cloud computing, and more particularly, to creating and executing applications within containers in cloud computing.

DESCRIPTION OF THE RELATED ART

High-performance computing (HPC) systems allow users to access high-performance computer resources to execute various workloads. As an example, HPC systems can be used to execute applications that require processing large amounts of data (e.g., such as applications in the fields of genomics, seismic, analytics, physics, and so on). In addition, HPC systems are typically distributed over multiple components (e.g., workstations or servers) connected to each other using a high-performance network.

When utilizing an HPC system for application use, the HPC system (or some portion thereof) must be configured according to the needs of each individual application. In order to allow for flexibility and/or reusability of an HPC system by different applications, specific constructs are needed for each application. Such constructs should ideally be transient, customizable, and efficient, which can present difficulties in both implementation and use.

SUMMARY OF THE INVENTION

Various systems and method for creating and executing containerized applications in cloud computing are disclosed. For example, one method involves identifying a command, where the command indicates an application to be executed by a compute node. The method also involves generating a job for transmission to the compute node. The job indicates a container. The compute node is configured to create an environment for the container, execute the application within the container, and generate results of the execution of the application.

BRIEF DESCRIPTION OF THE DRAWINGS

The embodiments of the present application may be better understood, and its numerous objects, features, and advantages made apparent to those skilled in the art by referencing the accompanying drawings.

Figure 1:
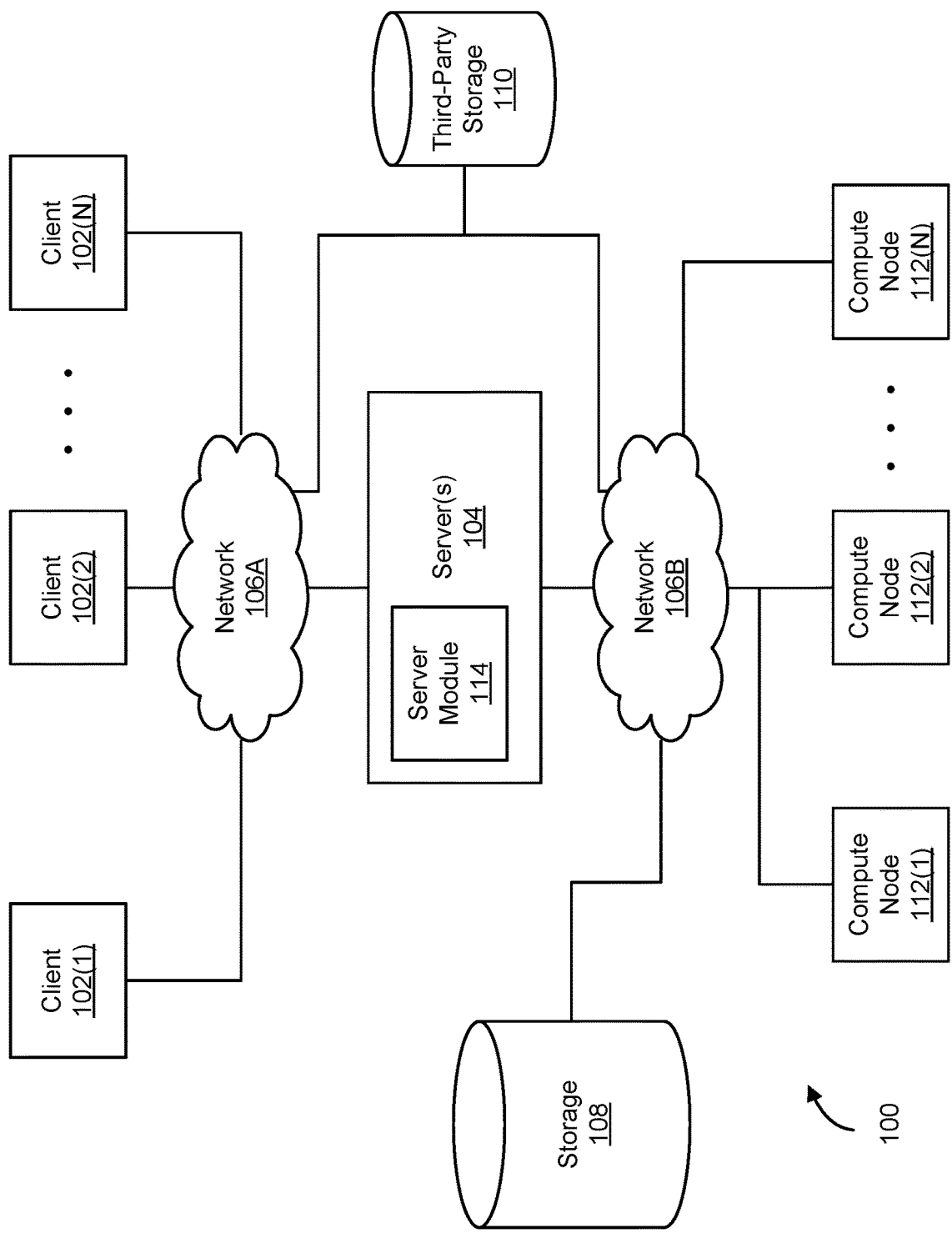
FIG. 1 is a block diagram illustrating a distributed computing system, according to one or more embodiments.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Although the present invention is described below in connection with several embodiments, the invention is not intended to be limited to the specific forms set forth herein. On the contrary, it is intended to cover such alternatives, modifications, and equivalents as can be reasonably included within the scope of the invention as defined by the appended claims.

Distributed computing systems (such as distributed High Performance Computing (HPC) systems) allow clients to schedule execution of various applications. In particular, distributed HPC systems can be beneficial for applications that require processing, managing, and/or storing large amounts of data, which can be computationally extensive. In some cases, such functionality can be unavailable, cost-prohibitive, too complex, and/or extremely time consuming for a client. Thus, distributed HPC systems can be an attractive option for such clients, given that distributed HPC systems (and the components within, which operate via a high performance network) can provide clients with access to the necessary computational power, storage power, and functionality specific to their application.

As an example, using a distributed HPC system, a user can schedule execution of a data mining application to data mine a database for various keywords and/or concepts. In another example, a user can schedule a genetics application to perform DNA sequencing operations. A distributed computing system, such as a cloud-based system, can also allow clients to store user data using cloud storage, and select an application for execution using the stored user data. The application can be stored, accessed, and/or executed, using a remote server. As a result, the user can perform complex operations on data without incurring costs for expensive server(s), application(s), and/or data storage. Embodiments of such a distributed computing system are described below.

FIG. 1 is a block diagram illustrating a distributed computing system 100 that includes a collection of clients, server(s), and storage. Distributed computing system 100 includes several clients, server(s), and storage, e.g., client(s) 102(1)-102(N), server(s) 104, storage 108, third-party storage 110, and one or more compute nodes 112(1)-112(N). Each of clients 102, server(s) 104, storage 108 and third-party storage 110 can communicate with each other using one or more networks, e.g., network 106A and 106B. Each of network 106A and 106B can include the Internet, a local area network (LAN), a wide area network (WAN), a storage area network (SAN), and/or any combination thereof.

It is noted that distributed computing system 100 may include a different number of elements. For example, in one embodiment, distributed computing system 100 may comprise server(s) 104 (which include server module 114), network 106(B), storage 108, and compute node(s) 112.

Each client, e.g., client(s) 102(1)-102(N), can be implemented as a computing entity, including but not limited to, a computer, a phone (e.g. a smart phone), a tablet, a virtual machine, among others. Each client accesses a server, e.g., server(s) 104, such as by issuing a request to execute an application. Each client also accesses, such as by using network 106A, user data that is stored using third-party storage 110. Each client also stores, using network 106A, user data at third-party storage 110. Each client provides one or more parameters to the server. These parameters can include location and/or type of data, operation(s) to be performed on this data, type and/or name of application(s) to be executed, among others.

In one implementation, the client accesses the network, e.g., the Internet, using an Internet browser to provide such a request. The server(s), e.g., server(s) 104, access the request data (including the provided parameters), control the performance of the specified operation(s) by one or more compute nodes, and return the results to the client(s). In essence, server(s) 104 provide HPC services to client(s) 102(1)-(N), using compute nodes 112(1)-(N), over network(s) 106A and 106B, and such functionality can be referred to as using a cloud, since the user data, the applications that operate on that data, the computing nodes that execute such applications, and/or the server(s) that control such operations are distributed over one or more networks.

Server(s) 104 include a server module (e.g., a server module 114). Server module 114 receives a request from the client(s) 102(1)-102(N) via network 106A. Server module 114 selects an application based on this request. For example, the request can include parameters that indicate operation(s) to be performed on data, and thus server module 114 selects an application that can perform such operation(s). Server module 114 selects computing resources for such an application. Server module 114 then communicates over network 106B with compute nodes 112(1)-112(N) to send communications (e.g., jobs) to execute the application using the selected computing resources with one or more compute nodes 112. Server module 114 receives the execution results of the application from the compute node(s) and returns such results to the client that initiated the request. Server module 114 also accesses various models, templates or layers, and data in storage 108 during operation.

Each compute node 112(1)-112(2) may include one or more computing resources. A compute node, e.g., compute node 112(1), receives communication, over network 106B, (e.g., based on a workflow) from server module 114 to execute an application using one or more computing resources. The application accesses the data from third-party storage 110 during such execution, as specified by the parameters. The compute node(s) also return results of the application execution to server module 114.

Each client, e.g., clients 102(1)-102(N), accesses third-party storage, e.g., third-party storage 110, via network 106A. Third-party storage 110 may include one or more distributed storage devices and/or external cloud storage, among others. Third-party storage 110 stores data, such as data that is stored by the client(s). The stored data can be operated on by the application. In one implementation, third-party storage 110 can be implemented by a cloud storage element, allowing client(s) to upload and store their data separately from the client(s).

The network, e.g., network 106A and/or 106B, can include the Internet and/or other network(s), such as LAN, WAN, and/or SAN. The network is configured to allow communication between the client(s), server(s), and/or storage. In one implementation, the client(s) access other elements of the distributed computing system using a first type of network (e.g., WAN), whereas the server(s) accesses other elements of the distributed computing system using a second type of a network (e.g., LAN).

Figure 2:
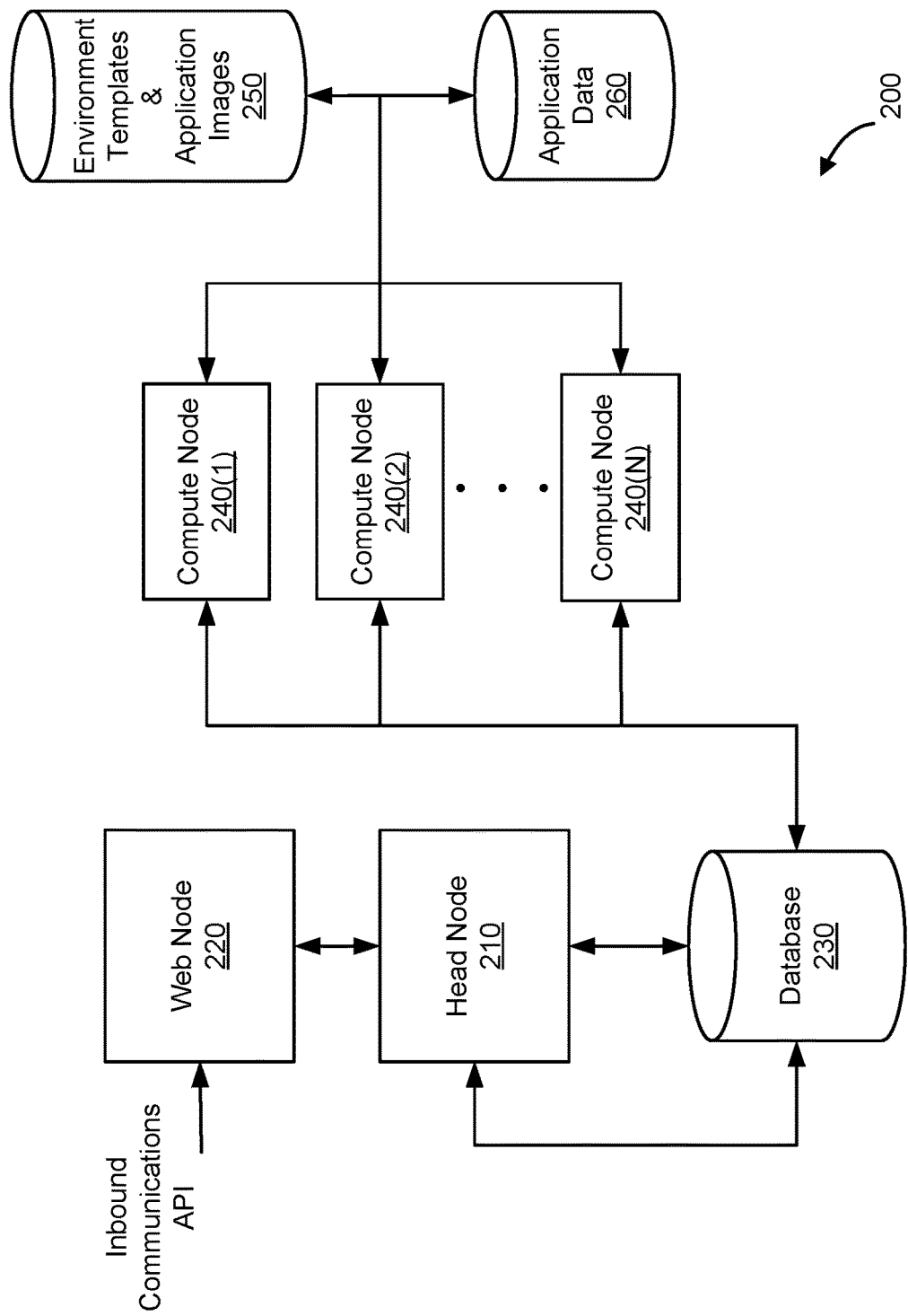
FIG. 2 is a block diagram illustrating a distributed computing system, according to one or more embodiments.

FIG. 2 illustrates another view of the system of FIG. 1, according to one or more embodiments. The server module 114 of FIG. 1 can be implemented using one or more modules. As shown, server module 114 is implemented using a head node, e.g., head node 210, and a web node, e.g., web node 220. Web node 220 receives incoming command(s) from clients, such as clients 102(1)-102(N) of FIG. 1, via an inbound communications Application Programming Interface (API). The incoming command(s) are received using connectivity data residing within database 230. Upon receipt, web node 220 forwards one or more portions of the command(s) to head node 210 using the connectivity data stored within database 230.

Head node 210 receives the incoming command(s) from web node 210. Such command(s) are analyzed by head node 210 to obtain information necessary to execute the command(s). As an example, head node 210 identifies one or more applications to be executed for the client. A corresponding environment (e.g., in the form of an environment template) for each application is identified or determined by head node 210, based on the command(s) or the types of applications being requested. An environment template is a stored representation of the environment, including the necessary configuration files and parameters. The environment templates are stored in environment templates and application images 250. The environment templates can be later retrieved and used by one or more of compute node(s) 240, as necessary, to create customized environment templates for use in a container.

A container represents isolated computational space supported by one or more compute nodes, which can be customized for the execution of one or more requested applications (e.g., referred to as a containerized application). In particular, a container is configured to provide an environment (e.g., an operating system) that supports and executes a requested application. The desired environment is implemented within the container using a corresponding environment template (which has been pre-configured and stored by a server) or by creating a new environment template. Thereafter, the selected application is configured and executed in the container, which implements the selected environment. The application is configured in the container using a corresponding application image. The application image is a representation of the application, including the necessary configuration files and parameters. Once configured, the application image is stored as such by the server, and later retrieved and used by the compute node to configure and execute the desired application within the container. In some embodiments, the combination of an environment template and application image (to be used together within a container) is saved as a container template.

Head node 210 determines the number of compute nodes to be used. Even further, head node 210 determines the number of containers to be launched within each node, the type of application(s) to be executed within each container, and the number of application(s) to be executed within each container. Application images, once created, are stored in environment templates and application images 250. Head node 210 generates and transmits jobs to one or more compute nodes (e.g., using connectivity information within database 230). A job typically includes one or more workflows, which represent sets of instructions to be followed by one or more compute nodes to launch one or more containers, implement an environment within each container, configure the one or more application(s) on top of the environment, and execute the application(s) accordingly.

Compute nodes 112 of FIG. 1 can be implemented using one or more compute nodes, e.g., compute nodes 240(1)-240(N), which are hereinafter collectively referred to as compute nodes 240. Compute nodes 240 include one or more resources (e.g., hardware components, such as processors, field programmable gate arrays (FPGAs), graphics processing units (GPUs), floating point units (FPUs), digital signal processors (DSPs), central processing units (CPUs), and other general and specialized processors, as well as other hardware and software resources) that are usable for configuring and executing applications. Compute nodes 240 receive jobs (and corresponding workflows) from head node 210 and utilize such information to enable the execution of application(s) within container(s).

In particular, compute nodes 240 launch containers (e.g., isolated spaces), on which to configure a given environment for the execution of one or more applications. Compute nodes 240 perform such functionality by retrieving and applying an environment template (from environment templates and application images 250) to a container, applying an application image (from environment templates and application images 250), and subsequently executing the application therein. In this manner, one or more applications can be executed within each container, as needed, to implement a job received from head node 210. Any data resulting from the execution of such applications can be stored within compute nodes 240 and/or as part of application data 260.

Upon receipt of such results, head node 210 reports the results to the original client. In other embodiments, where the command requires one or more applications to be executed and/or one or more containers to be executed (either within the same compute node or among several compute nodes), head node 210 awaits further results from any remaining compute nodes, prior to reporting a complete set of results to the original client. In such cases, the results may be processed further and/or merged to generate a combined result for the original client.

Storage 108 and third-party storage 110 of FIG. 1 can be implemented using a number of different storage elements. As shown, storage 108 and third-party storage 110 are implemented using a database, e.g., database 230, environment template and application images, e.g., environment template and application images 250, and application data, e.g., application data 260.

Database 230 enables network communications and the transmission of jobs and results between head node 210 and compute nodes 240. Environment template and application images 250 serve as a repository for storing environment templates and application images for use in configuring and executing applications within containers. Application data 260 stores data related to applications, whether before, during, or after execution of such applications within their respective containers.

Figure 3:
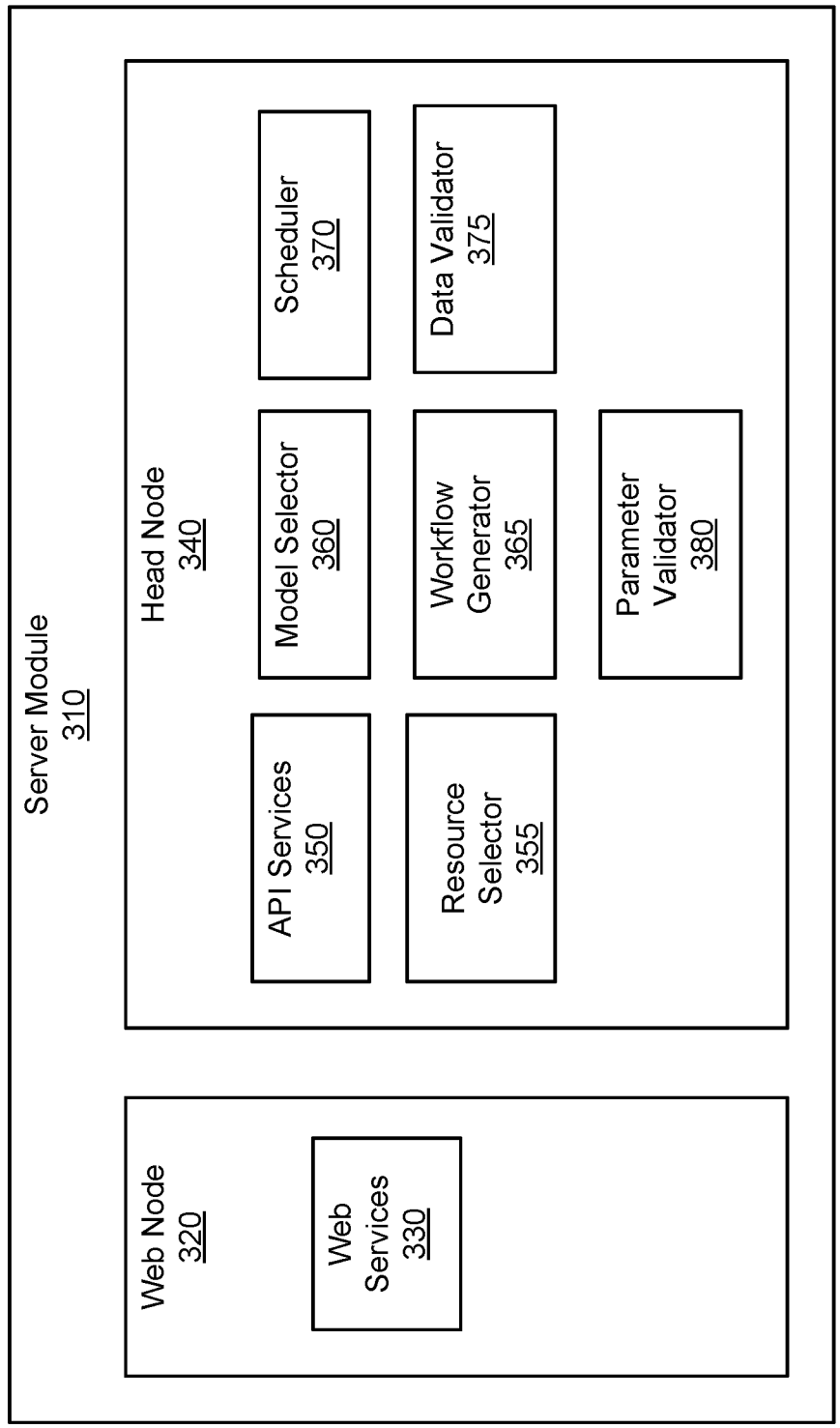
FIG. 3 is a block diagram illustrating a server module, according to one or more embodiments.

FIG. 3 shows a server module 310, according to one or more embodiments. As shown, server module 310 includes web node 320 (which further includes web services 330) and a head node 340 (which further includes API services 350, resource selector 355, model selector 360, workflow generator 365, scheduler 370, data validator 375, and parameter validator 380).

Web node 320 implements a website via web services 330. Such a website is used by a client, such as one of clients 102 of FIG. 1, to enter and submit commands (along with a number of different accompanying parameters). For example, a command may include information regarding one or more applications to be executed, the number and types of operations to be performed, the types of environments to be used for each application, and so on. Web node 320 further includes a user interface (UI) that transmits the received commands to head node 340.

Head node 340 receives commands from web node 320 using API services 350. API services 350 comprises an inbound API (such as inbound communications API shown in FIG. 2), which receives commands from a client. API services 350 intakes the command information and identifies the command and any associated parameters. For example, API services 350 identifies the number and types of application(s) being requested, as well as the types of operations to be performed by each application. In some cases, API services 350 also identifies the type of environment to be used for each application.

Parameter validator 380 validates the identified parameters. Such validation includes performing a determination as to whether the identified parameters (including the number and type of applications, requested operations, environments, and so on) are recognizable and usable in the creation of jobs.

Model selector 360 selects one or more models to be used for the containers. A model typically includes information regarding how to generate various scripts for an environment and an application to be used in a container (e.g., via an identified environment template and an identified application image). Moreover, a model also includes information regarding one or more computing resources to be used to execute the requested application. Data validator 375 validates the selected models to ensure the models are available and usable by a compute node.

An environment can be configured within a container using an environment template. A similar environment template can be used for most applications. Some applications, however, may require a few minor modifications. In such cases, a pre-existing environment template is retrieved, updated as needed, and saved as an updated environment template. In other cases, a new environment template can be created from a base template. An application for a container can be configured in a similar way. In particular, an application image is created and/or modified and saved accordingly for later use.

Head node 340 defines a job for creating one or more containers within one or more compute nodes. In particular, the job combines environment instructions (e.g., instructions for implementing an environment in each corresponding container using an environment template) and application instructions (e.g., instructions for configuring and executing one or more applications in each corresponding container using an application image). Head node 340 then transmits the job to a selected compute node for implementation therein.

Resource selector 355 and workflow generator 365 receive the selected model and/or parameters. Resource selector 355 determines the computing resources to be selected based on the parameters. For example, resource selector 355 communicates with compute nodes to determine what resources, if any, are available at each computing node. Resource selector 355 also determines if any of the available resources need to be configured, prior to application execution, and if so, how each resource should be configured.

Workflow generator 365 generates the job subparts to be transmitted to the compute nodes. The job subparts indicate the number and type of containerized environments to be used, as well as the number and types of applications to be executed within each containerized environment. The job also indicates how each resource is to be configured prior to the execution of an application.

Scheduler 370 combines the job subparts for transmission to the one or more compute nodes. Scheduler 370 selects one or more compute nodes (from the array of compute nodes), and instructs the selected compute nodes to perform the applicable job subparts.

Figure 4:
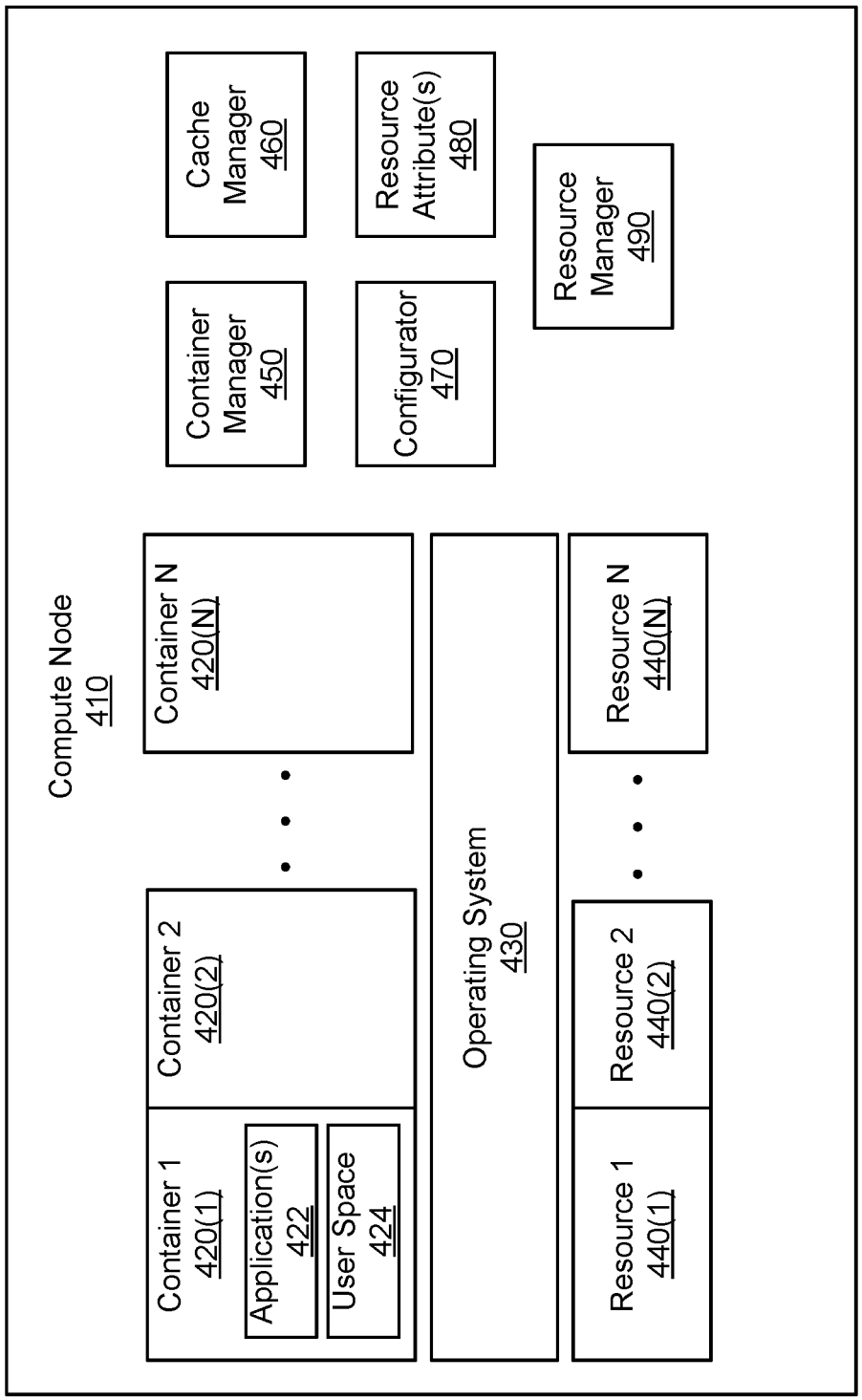
FIG. 4 is a block diagram illustrating a compute node, according to one or more embodiments.

FIG. 4 illustrates a compute node 410, according to one or more embodiments. Compute node 410 can be implemented as any one of compute nodes 112 of FIG. 1. Compute node 410 includes several components, as described below. As shown, compute node 410 includes a set of containers (illustrated as containers 420(1)-420(N), and collectively referred to as containers 420), an operating system 430, a set of resources (illustrated as resources 440 (1)-(N), and collectively referred to as resources 440), a container manager 450, a cache manager 460, a configurator 470, resource attribute(s) 480, and a resource manager 490.

Each of containers 420 represents isolated space dedicated to the execution of one or more applications. An environment for a container is implemented using an environment template. As shown, container 420(1) provides an environment for executing application(s) 422. As will be appreciated, in view of the present disclosure, application(s) 422 can, in fact, be one or more applications of the same or different type. User space 424 represents a transient space that is dedicated for the execution of application(s) 422. For example, user space 424 stores application scripts and configuration files for application(s) 422. In addition, data resulting from the execution of application(s) 422 can also be temporarily stored within user space 424. Once a session ends (e.g., the execution of application(s) 422 is complete), the data resulting from the execution of application(s) 422 can be saved in other storage (e.g., such as third-party storage 110 of FIG. 1 or application data 260 of FIG. 2).

Similar types of environments can be created for each of containers 420(2)-420(N). In some cases, the environment to be used in another container arises from the same generic environment template as container 420(1), potentially with some number of modifications. In addition, although not shown, other applications can also be executed with the same container. Each of containers 420 represents isolated computational space (with isolated user-space instances) that is dedicated to executing one or more applications. Each container 420 has its own access permissions, memory allocation, processes, files, and so on. Each of containers 420 is layered on top of operating system 430, and thus represents a virtualization of the same or similar operating system. Containers 420 need not emulate hardware, e.g., resources 440, which can speed up the execution of the container and the applications executing within. Thus, containers can be launched quickly.

Applications executing within a container, such as application(s) 422, produce results that are saved in storage, and in some instances, combined with the results of other applications running within the same or other containers at the same or different compute nodes. Once all application(s) within a single container are done executing, the container itself is de-provisioned. De-provisioning a container means that the application(s) and environment within the container are removed from the container. Thereafter, new containers can be launched quickly within a compute node by repeating the same process.

Resources 440 are computing resources that can be used to execute application(s), such as application(s) 422. As an example, computing resources 440 can include hardware components, such as FPGAs or processors (such as GPUs, DSPs, or other dedicated and/or specialized processors). Resources 440 can execute one or more portions of an application. For example, resource 440(1) and 440(1) can execute two functions for application(s) 422, in parallel, as specified in a workflow received by compute node 410. By doing so, overall performance of an application can be increased. Resources 440 access data within compute node 410, on a server module (such as server module 114 of FIG. 1), or other storage (such as storage 108 or third-party storage 110 of FIG. 1) when executing an application.

Resources 440 comprise resource attributes, illustrated as resource attribute(s) 480, which characterize resources 440. As an example, resource attributes 480 can include metadata that describes the capabilities of resources 440 and/or compute node 410. Such information can be used to determine whether compute node 410 is capable of executing and/or available to execute one or more applications.

Resource manager 490 manages the execution of one or more applications within containers 420 using resources 440. Resource manager 490 tracks the status of resources 440 to identify the resources 440 that are currently in use by an application and those that are available for use. In addition, resource manager 490 communicates such status information to a server module to indicate which resources are busy executing other applications, and thus unavailable for use. Configurator 470 configures resource 440, as needed, to execute an application, using configuration scripts that are received as part of a job.

Container manager 450 receives a job from a head node. Such a job includes instructions for launching a container, with the specified environment, and subsequently configuring and executing the application therein. The environment for the container is implemented by cache manager 460, as well as operating system 430. When the container is launched, compute node 410 may not have or need information regarding the type of application to be configured and executed within the container. Compute node 410 will determine the type of application to be executed by retrieving the specified application image.

Container manager 450 facilitates the use of a container, to enable a developer to update and manage applications. In such cases, container manager 450 creates a transient environment where the developer can create, modify, and/or test applications (via application images). When the developer is finished, container manager 450 can send instructions to save or discard the environment template and/or the application image in use. If either the environment or application are to be saved, a snapshot of the environment template and/or application image are taken and saved to the image store.

As an example, a developer may wish to update a version of an application. The developer will retrieve the applicable application (e.g., via the pre-existing application image) and configure the application within the container on a compute node. The developer tests and saves the application, if needed, as an updated application image. Any future launches of the application will utilize the updated application image.

Cache manager 460 copies environment templates and application images, as needed to storage (e.g., such as environment template and application images 250 of FIG. 2). Cache manager 460 optimizes the performance of compute node 410, by copying and/or caching any common elements onto local disks on compute node 410. Such an optimization reduces network and file server traffic for the reads, thereby speeding up the launch and distribution of applications within containers. As an example, if 10 applications use the same type of environment, the environment template is cached automatically onto the appropriate compute nodes. Thus, when additional applications are launched, compute node 410 does not need to download the same environment template again.

Figure 5:
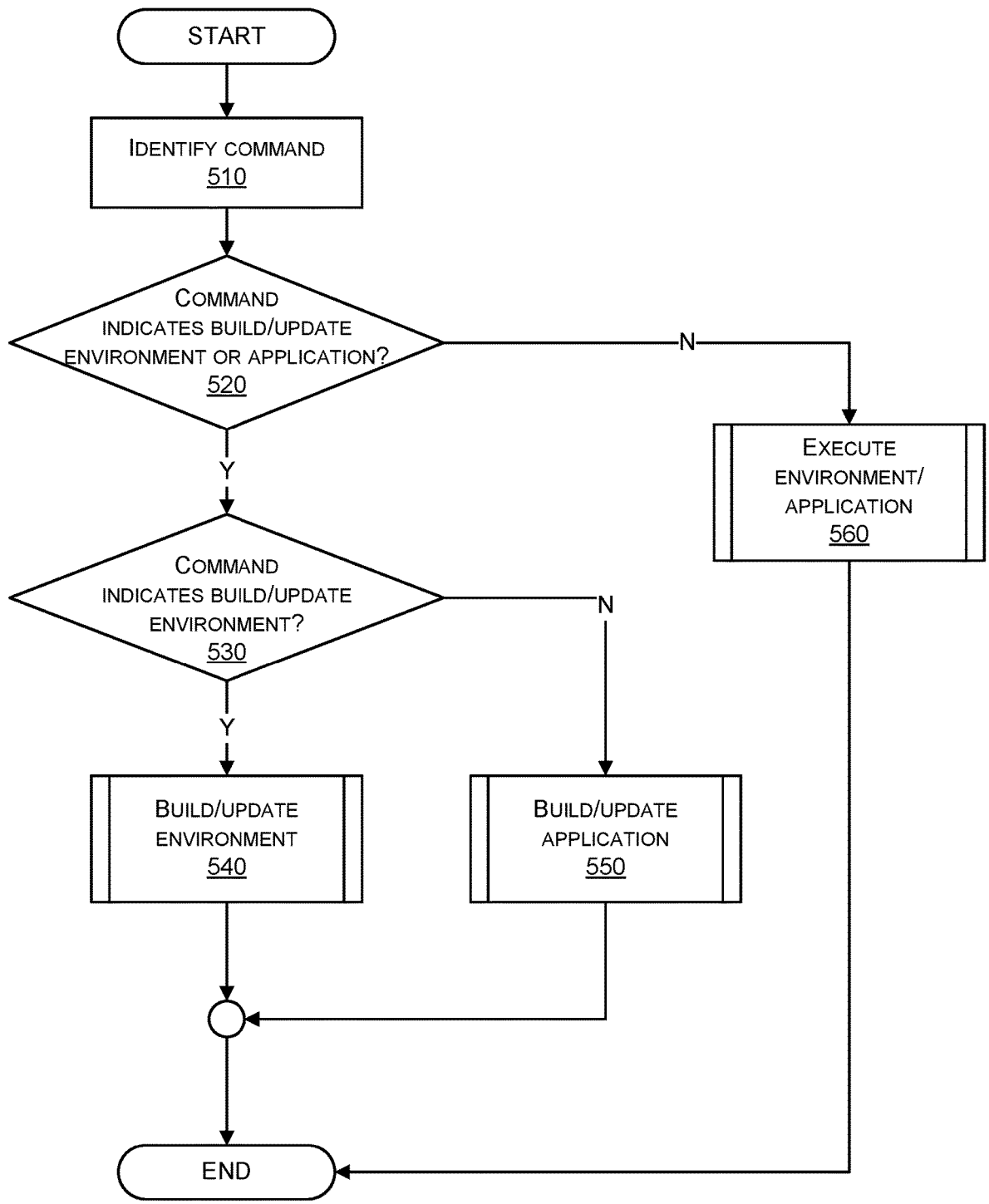
FIG. 5 is a flowchart illustrating a method for using a distributed computing system, according to one or more embodiments.

FIG. 5 is a flowchart illustrating a method for using a distributed computing system, according to one or more embodiments. As will be appreciated in light of the present disclosure, this method (as well those in FIGS. 6-10) may be modified in order to derive alternative embodiments. Also, the operations in these embodiments are shown in sequential order. However, certain operations may occur in a different order than shown, certain operations may be performed concurrently, certain operations may be combined with other operations, and certain operations may be absent in another embodiment. The method of FIG. 5 can be implemented by a server module, such as server module 114 of FIG. 1, and/or a compute node, such as compute node 112 of FIG. 1.

In element 510, the head node identifies a command. The command can be received from a web node via an application program interface (API). The command can indicate one or more applications that are to be executed within one or more nodes. The command can also indicate one or more operations that are to be performed. Such operations can include the creation of an environment or application and/or the modification of a pre-existing environment or application. Furthermore, the command can also provide one or more parameters for use in the creation and/or execution of an environment and application. Some example parameters include the type of environment to be used, the type of application to be executed, the configuration parameters for the application, and so on.

In element 520, the head node determines, based on the command and the parameters therein, whether an environment or an application is to be built or updated. In the event that an environment and/or application are to be built or updated, element 530 is performed. Otherwise, element 560 is performed.

In element 530, the head node determines, based on the command, whether an environment is to be built/generated. If the environment is to be built/generated, element 540 is performed. Otherwise, element 550 is performed. In element 560, the head node facilitates execution of a selected environment/application, as further described with reference to FIG. 8. In element 550, the head node facilitates building/updating an application, as further described with reference to FIG. 7. In element 540, the head node facilitates building/updating an environment, as further described with reference to FIG. 6.

In general, a container is a virtualization of an operating system and one or more applications that allows for isolated user-space instances. Each container has its own access permissions, memory allocation, processes, files, etc. When employing a container in the manner described herein, low-level elements of the operating system (e.g., the kernel and device drivers) typically do not run inside the container, but instead run outside the container. These low-level elements of the operating system are shared with the main operating system (e.g., the operating system that is installed on a physical computer, such as operating system 430 of FIG. 4). Thus, the main operating system can create multiple containers that execute using facilities provided by the main operating system. Each container isolates an application, such that each application executes as if the application were running in its own isolated environment. Such an application actually shares a significant portion of the underlying operating system elements with the main operating system (and other containers, potentially).

Because a container uses the underlying system components, the container is thus fast and efficient. Applications that execute in each container behave as if they are executing on their own operating systems. However, each application is executing in a view of the main operating system. The operating system used by the container appears to be different than the main operating system, but it uses the same elements. Thus, the operating system used by the container represents a different view, and can put restrictions around what the application has permission to access. From a security perspective, a container is similar to a virtual machine, without the typical virtualization of the underlying system hardware.

The head node controls dispatch for container execution on resources within compute nodes (employing devices such as GPUs, FPGAs, etc.). The head node uses environment templates to create an environment for a container. The environment template, once created, can be duplicated, and modified, if needed. The head node facilitates dynamic adjustments to the environment template by installing the environment template on a compute node, modifying the environment template, as needed, and saving the updated environment template. When an environment template is installed on a compute node, each container can obtain its own Internet Protocol (IP) address for easy access and modifications.

In general, the above process creates an environment within a container, which is then used to configure applications therein through a batch system. Batch scheduling is used to build/provision and de-provision container environments that either build or execute applications. The container environments are typically designed from environment templates, as most applications execute on several Operating Systems, such as CentOS 5, CentOS 6, or UBUNTU.

Figure 6:
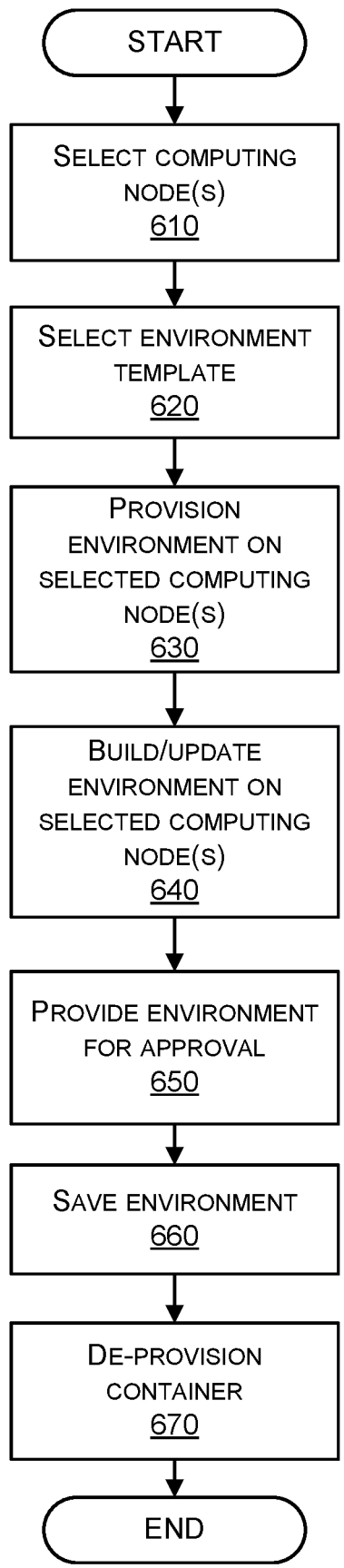
FIG. 6 is flowchart illustrating a method for building/updating an environment, according to one or more embodiments.

FIG. 6 illustrates a process for building/updating an environment, according to some embodiments. A new environment or updated environment for a container can be built as an environment template or updated environment template, saved, and used, as needed.

In element 610, the server module selects one or more computing nodes for creating or updating an environment. Such a selection can be based on availability of the compute nodes (and the resources within) and/or on various other parameters. Embodiments of a selection of computing nodes is described in U.S. Pat. No. 8,775,576, entitled "Reconfigurable Cloud Computing," which is included herein by reference.

An environment template to be used is selected at element 620. A base environment template can be selected for creating a new environment (e.g., a bare operating system). In other embodiments, a pre-existing environment template is selected from an image store and used as a starting point when modifying an environment. In even further embodiments, an environment template can be created from scratch (e.g., without using a base template or pre-existing template).

In element 630, the server module provisions (e.g., assigns) the environment to be installed on the selected computing node(s) within a container. The server module can also provide an IP address and a password for a user to log into the environment. In one embodiment, the server module makes a full copy of the environment template in the image store, and enables it for editing prior to the environment template being provisioned on the selected computing node(s) (i.e., for any version control issues).

Information regarding modifications to be made to the selected environment are identified and implemented at 640. In one example, a user launches a remote secure shell session into the selected environment and make desired changes (e.g., dependent software installation/updates) to the environment.

In element 650, the newly built/updated environment is submitted for approval. This can comprise, for example, submitting the newly formed/updated environment for approval by a system administrator. Once approval is obtained, the new/updated environment template is saved to the image store at element 660. For example, a developer user can execute a process inside the environment that sends commands to the server module and/or compute node to save the environment as an environment template. Once the new/updated environment template is saved, the container (which comprises the environment) is de-provisioned at element 670. After performing elements 610-670, the newly built/updated environment template is ready for use either to host applications or to be used as a base environment template for future edits.

When performing the elements of FIG. 6, the server module initiates the launching of a container at a compute node and subsequently allows a developer to log in to the container to build/update an environment. When the container manager at the compute node receives instructions for building/updating the environment, the container manager can make a copy of the selected environment template from the image store. The selected environment template is then made available to a developer for editing and providing version control. Once the environment has been built or updated, the new/updated environment template is saved and stored to the image store.

An environment is referred to as the operating system that runs inside a container. The environment can include libraries (e.g., application runtime libraries), application packages, and/or frameworks. Thus, an environment, once implemented within a container, enables one or more application(s) to execute within the container.

As an example, a developer can indicate installation and execution of a genomics application. The head node will schedule installation of a generic environment and the application on the compute node (e.g., within a container). The environment will first be executed within the container. Subsequently, the genomics application will be downloaded, compiled, and configured within the container. A user can indicate how the genomics application is to be executed by the environment upon startup, for example. In such a case, the environment will need to be customized, using the generic environment template as a starting point. Moreover, in embodiments where the application is particularly large, a container is launched with the application, instead of configuring the application within a selected environment.

Figure 7:
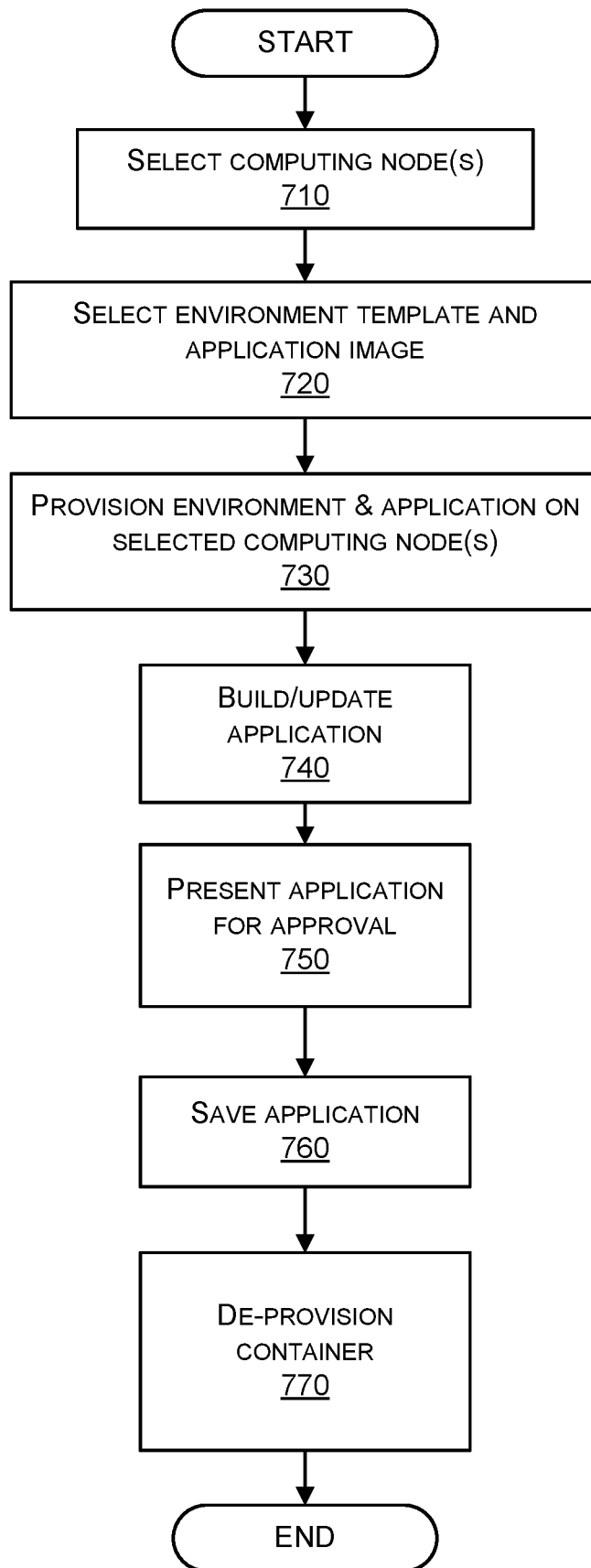
FIG. 7 illustrates a flowchart illustrating a method for building/updating an application, according to one or more embodiments.

FIG. 7 illustrates the building/updating of an application, according to one or more embodiments. Once the application is built or updated, the newly formed/updated application is saved and stored for later use.

In element 710, a server module selects one or more computing nodes on which to build/update the application. A selection of compute node(s) can be based on availability of such nodes, and/or on various other parameters, such as described above with reference to element 610 of FIG. 6.

In element 720, the head node selects the environment template and the application image to be provisioned on the selected computing node(s). The application image is selected based on the application to be executed, as defined by the command parameters. The selected application image can be a new application image or a pre-existing application image. The environment template can be selected based on the selected application.

The selected environment template and application image are provisioned on the selected computing node(s) at element 730. The server module can also provide an IP address and a password for a user to log into the environment that is constructed at the compute node(s) to access and make changes to the application image. In one embodiment, at least a majority of applications are provisioned with a base environment template (e.g., such as one that uses a CentOS Operating System (OS) version 6).

In element 740, information regarding the changes to be made to an application are identified and implemented at the compute node(s). For example, a user can launch a remote secure shell session into an environment (e.g., the container itself) and make the desired changes to the application. The user can also adjust a "wrapper" that is used to launch the application and to interpret the corresponding API (that can be defined separately).

The newly created/updated application is presented for approval at 750. Such approval can be obtained by submitting the created/updated application to a system administrator. Upon approval, in element 760, the newly created/updated application is saved to the image store (either as a new application image or as a copy of the changed portions only). In order to save the new/updated application, a process can be executed from inside the container environment to send a command to the server module and/or compute node to save the new/updated application image. In some cases, the combined environment template and application image are saved as one template. Once the newly created/updated application image has been saved (either alone or in combination with an environment template), the container is de-provisioned at 770.

When building or updating an application, the head node sends instructions to the compute node that describe the environment and the application to be packaged within the environment. Upon receipt of such instructions, the compute node retrieves the necessary environment template and launches the environment within a container. The corresponding application image is then retrieved, configured, and executed within the container to enable modifications to be made.

A differential search of the application can be performed to determine any and all changed portion(s) of the application. As an example, a differential search of the application can help identify changed portions of the application, such as source and/or machine code elements and/or libraries and dependent code. In such cases, only the changed portions of the application are saved. The changed portions typically include the application and any dependent library portions, and not the entire environment.

When building an application, the developer selects an application image, and optionally an operating system (e.g., environment) to execute the application. In some cases, however, the environment can be determined by the head node. In one example, the environment is determined to be UBUNTU. In such a case, the head node selects and instructs the creation of a container that includes a generic UBUNTU operating system, based on a UBUNTU environment template that includes other parameters for execution. The head node also includes instructions to execute the selected application inside the container (i.e., once the environment is instantiated on the compute node). The process of executing the application inside the container is referred to as layering the application on top of the operating system.

If the application image does not already exist, then the application is considered to be a new build. However, if the application image already exists, then the developer accesses the pre-existing application image, modifies the application image, as needed, and saves the updated application image to the image store (either as another application image or as changed portions to the pre-existing application image). The compute node thus saves any updates over the previous version to the image store (i.e., performs an incremental save).

In one embodiment, instead of saving the entire container (e.g., using a snapshot process), the compute node (and/or other modules) performs a differential search of the application built. The compute node can determine the base operating system, and then determine the changes made to the base operating system. Such changes can include any dependencies that have changed (e.g. libraries, etc). The newly built/updated application is sent for approval, such as to determine whether the application is directed to an acceptable purpose. Once the application is approved, the application is saved to the image store (e.g., a catalog or image store).

On the compute node, there are typically two general layers being installed using the container. The first layer is the operating system that runs inside the container. The second layer is the application that is configured and automatically executed inside the container. When installing a new application, the developer selects an operating system (e.g., environment) to be used within the container (e.g., UBUNTU) and then installs the application. The set of the environment and the application are then saved to the image store. For modifying an existing application (such as for a new application version), the head node schedules the base container with an existing version of the application. The operating system and the application are then layered inside the container as executing on the compute node. The application is then modified and saved as an updated application image to the image store.

Figure 8:
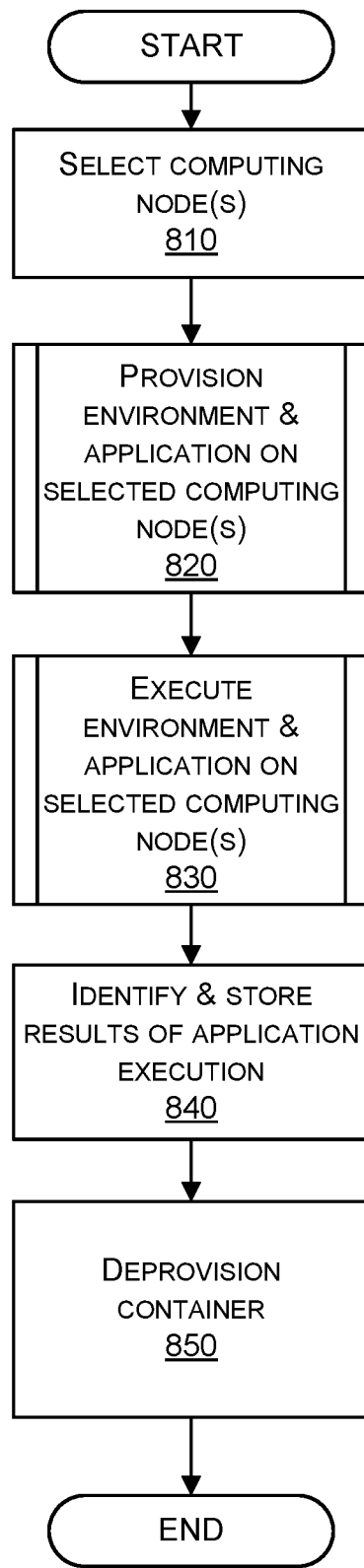
FIG. 8 illustrates a flowchart illustrating a method for executing an application/environment, according to one or more embodiments.

FIG. 8 illustrates execution of an application, according to one or more embodiments. The applications can be launched either via an API or a web portal. The server module controls the containerization and on-demand onboarding of applications on one or more compute node(s), in response thereto.

In general, an application is scheduled for execution (on the reconfigurable compute node(s)) by the head node, using a batch process. A batch process is performed by having the head node schedule a job that includes instructions for creating, configuring, and executing an application and the necessary environment within a container at the compute node(s). The generated job can get deployed on any compute node in a cluster of compute node(s). Once the job executes and finishes, the results of the job are saved (in order to preserve data for the user), and the job is de-provisioned.

An application is typically selected from the image store, such as from an application image catalog. In response to direction from, e.g., a user, the head node selects and schedules an application, on demand, from the catalog, for execution on the compute node(s). The head node also selects an environment template for the container that will execute the selected application (on the compute node).

The compute node, upon receiving a job (or a relevant portion thereof), executes the job (e.g., the instructions as to the execution of one or more applications) using a container manager to create one or more containers. The transient environment is created using the selected environment template and subsequently layering the selected application image on top of the operating system. When the application is executed inside the container, the application behaves as if the application were executed on the selected operating system. Once the application finishes executing, the data produced by the execution of the application is preserved, and the container is de-provisioned.

The container manager waits for the application to finish executing, then captures the output results and provides access to this data (e.g., to users of the application). Such data access can be provided using a local, high-speed network architecture, such as Infiniband. For example, an application may be executed across 10 compute nodes using 10 containers. These 10 compute nodes can communicate internally using Infiniband and access resulting data from each other. Infiniband provides a computer network communications link that features high throughput and low latency. As an example, Infiniband performance can range from 100-300 Gigabits per second of throughput and 0.5 microseconds for latency.

The process of FIG. 8 begins at element 810, where the head node selects one or more computing node(s) for executing the application. This selection can be based on availability of such compute nodes (and the resources therein), and/or on various other parameters. At element 820, the head node provisions (e.g., assigns) the necessary environment and selected application on the selected computing node(s). Details regarding the process for provisioning the environment and application on the selected computing node(s) are explained in further detail with regards to FIG. 9.

An environment can be selected based on the selected application. In one embodiment, at least a majority of applications are provisioned with a base environment template (e.g., such as an environment template that designates an operating system such as RedHat Operating System (OS) version 6). The head node provisions a "transient space," which consists of the base environment, the application, and dedicated user space for executing the application. In one embodiment, the base environment templates are cached on local storage (i.e., storage that is local to the compute node(s)) to reduce any bottlenecks.

At element 830, the environment and application are executed on the selected compute node(s). In one implementation, application parameters may be passed into the container, such as using a wrapper that is defined for the application inside the container. Parallel storage can also be made available to the application for processing data sets and storing output. Details regarding the execution of the environment and application on the selected compute node(s) can be seen in further detail with regards to FIG. 10.

In element 840, the results of the execution of the application are identified and stored. Such results can be stored within the compute node and/or in other storage within a distributed computing system. Such results can then be accessed by the user. Once the application has finished executing and the results have been saved, the container (which includes the environment and application) is de-provisioned at element 850.

Figure 9:
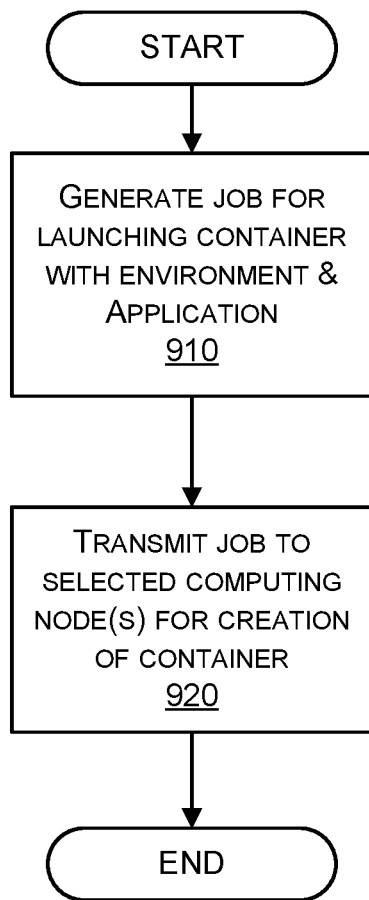
FIG. 9 is flowchart illustrating a method for provisioning an environment and application on selected computing node(s), according to one or more embodiments.

FIG. 9 illustrates a method for provisioning an environment and application on selected computing node(s), according to one or more embodiments. The elements of FIG. 9 can be performed by a server module.

The method for provisioning an environment and application on a compute node begins at element 910 where a job is generated for launching a container at the selected computing node(s). Prior to generating the job, the head node identifies the environment to be used for the application. The environment can be extracted directly from a command, or alternatively, determined by the head node based on the application to be executed. Once the environment (and application) have been identified, the job can be generated.

A job describes the details needed to launch a container with the necessary transient environment for the application. Such information can be integrated in the job as a first set of instructions for the environment (which can be generic instructions) and a second set of specific instructions for the application. The job generated at 810 can comprise, for example, parameters, resources, models (including the necessary environment templates and application images, or references thereto) and workflows (which include control scripts, job scripts, configuration scripts, and so on).

The job, once generated, is transmitted to the selected computing node(s) at element 920. The selected compute node(s) can then use the content of such a job to configure and execute the necessary environment/application within a container, as shown in FIG. 10.

Figure 10:
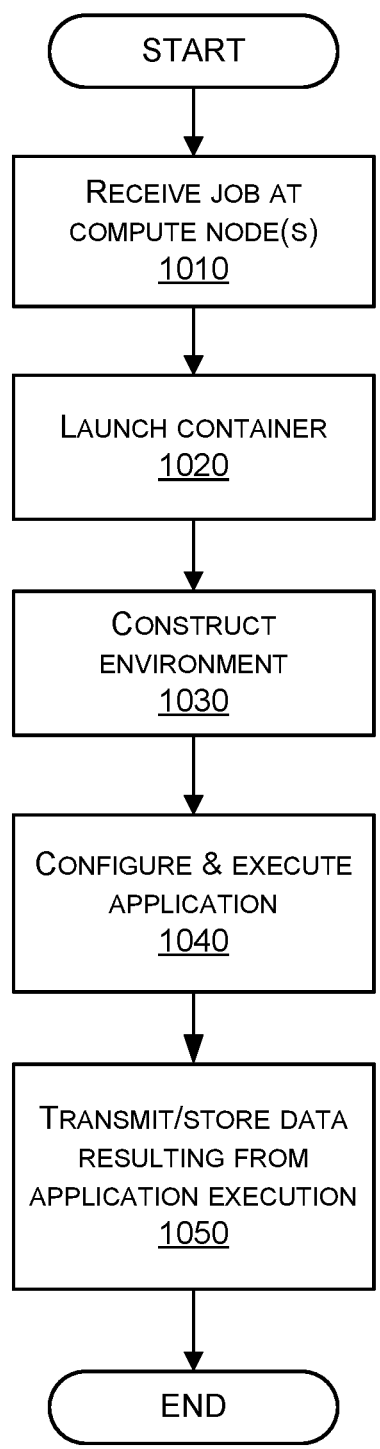
FIG. 10 is a flowchart illustrating a method for executing an environment and application on selected computing node(s), according to one or more embodiments.

FIG. 10 illustrates the execution of an environment and application on a selected computing node(s), according to one or more embodiments. The process of FIG. 10 begins at element 1010, where a job is received by a compute node(s). Once received, a container is launched at element 1020.

Containers are constructs that are used to create transient environments for applications. When used, containers enable applications to execute within isolated, customized environments, which include dedicated user space for such applications. In addition, containers can be configured fairly quickly, since containers share the same or similar elements as the main operating system used by the compute node(s).

One or more portions of an application can then be executed within the container, using the resources at the compute node.

An environment to be constructed for the container can identified by the instructions included in the job. In some embodiments, these instructions reference an environment template that was previously created and/or updated. Such an environment template may be stored and retrievable from local cache or within other storage units in a distributed computing environment. Once accessed, the environment template is used to construct the environment that is needed for the application, as shown in element 1030.

In element 1040, the application is initiated, configured, and executed within the container. The application can be configured within the container using the instructions that are included in the received job. Such instructions may reference an application image that may have been previously generated and/or updated. The application image may be stored and retrievable from an application catalog (which may be stored locally or in other storage databases). The necessary parameters and configuration files may be used to implement the application within the container.

Once configured, the application is executed within the container. The execution of the application will result in the generation of application data. The application data is then transmitted to the server and/or stored at the compute node, as shown in element 1050. The application data can be stored locally (e.g., within the user space of the container). In some cases, the resulting data can also be combined and/or shared with other resulting data from other containers at the same compute node(s) or at other compute node(s).

Figure 11:
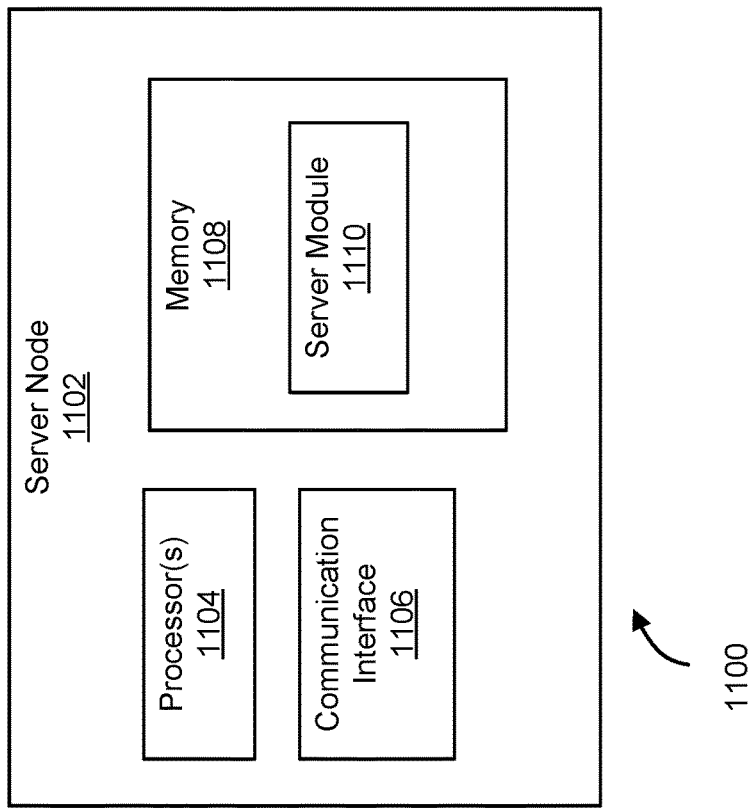
FIG. 11 is a block diagram illustrating a server node, according to one or more embodiments.

FIG. 11 is a block diagram 1100 of a server node 1102, such as server 104, as described in FIG. 1, among others. Server node 1102 includes one or more processor(s) 1104, a communication interface 1106, and memory 1108. It is noted that is some embodiments, one or more of these elements may be combined. Memory 1108 includes server module 1110. Server module 1110 can be an implementation of server module 114, as described in FIG. 1, among others. It is also noted that server module 1110 may be implemented as software and/or hardware module. It is also noted that in some embodiments one or more of elements of server node 1102 may not be used. Communication interface 1106 facilitates communication of server node 1102 with the client(s), the node(s), and/or various storage system(s). Processor(s) 1104 execute server module 1110. Server module 1110 can implement at least portions of the methods described in FIGS. 5, 6, 7, 8, and 9.

Figure 12:
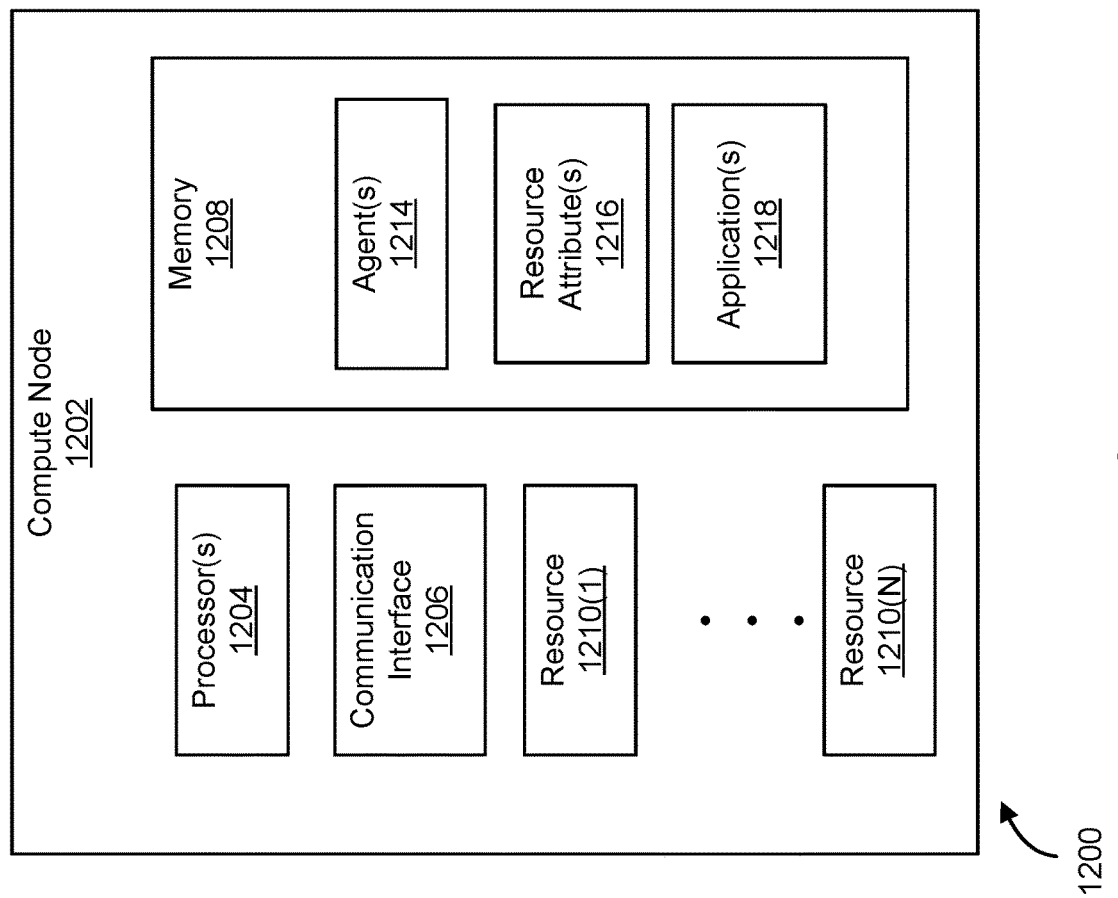
FIG. 12 is a block diagram illustrating a resource node, according to one or more embodiments.

FIG. 12 is a block diagram of a compute node 1202, such as compute nodes 112(1)-112(N), compute nodes 240(1)-240(N), and/or compute node 410. Compute node 1202 includes one or more processor(s) 1204, a communication interface 1206, memory 1608, and one or more resource(s) 1210(1)-1210(N). It is noted that is some embodiments, one or more of these elements may be combined. Memory 1208 includes one or more agents 1214, one or more resource attributes 1216, and one or more applications 1218. It is also noted that various modules of compute node 1202 may be implemented as software and/or hardware module(s). It is also noted that in some embodiments one or more of elements of compute node 1202 may not be used. Communication interface 1206 facilitates communication of compute node 1202 with the server, other node(s), and/or various storage system(s). Processor(s) 1204 execute one or more of agent(s) 1214 and/or one or more applications 1218. Resource(s) 1210(1)-1210(N) are implementations of resources 440(1)-440(N). Application(s) 1218 can be implementation(s) of application(s) 422. Agent(s) 1214 may include one or more elements of (and/or portions of) the scheduler, resource manager, and/or configurator.

Elements of network architecture can be implemented using different computer systems and networks. An example of one such network environment is described below with reference to FIG. 13.

Figure 13:
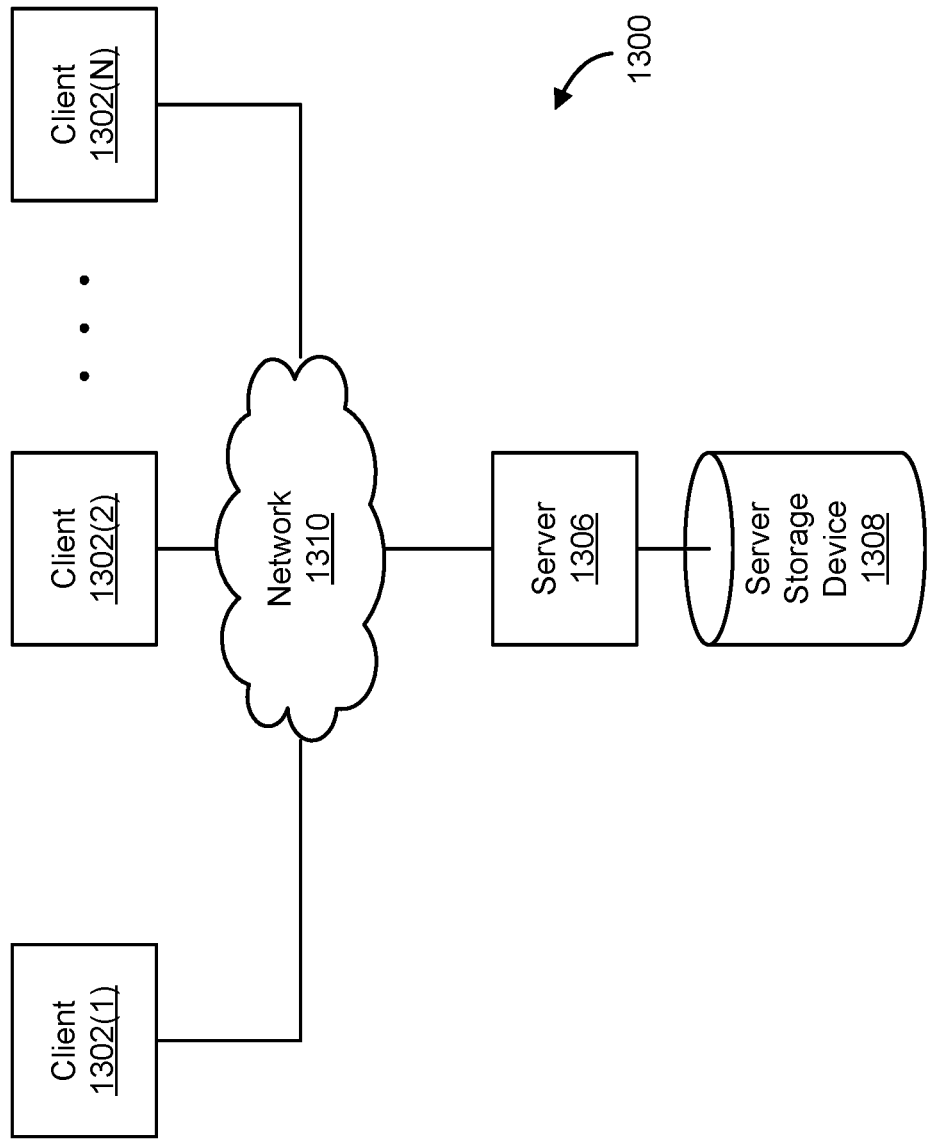
FIG. 13 is a block diagram illustrating a network architecture in which an embodiment of the present invention can be implemented.

FIG. 13 is a simplified block diagram illustrating a network architecture 1300 in which one or more clients are provided with access to a server via various network connections. As depicted in FIG. 13, clients 1302(1)-(N) are coupled to a network 1310 (which can be used to implement network 106A and/or 106B), and so are able to access a server 1306 (which can be used to implement server 104 and/or node(s) 112(1)-112(N)) via network 1310. Other servers (not shown) can be used instead to implement server 104). A client can be implemented using, for example, a desktop computer, a laptop computer, a workstation, a server, a cell phone, a smart phone, a network-enabled personal digital assistant (PDA), or the like. An example of network 1310, which can be used by clients 1302(1)-(N) to access server 1306, is the Internet. Alternatively, access to server 1306 can be provided by a local area network (LAN) utilizing Ethernet, IEEE 802.11x, or some other communications protocol. As will be appreciated, server 1306 can be accessed by clients coupled directly thereto (not shown).

As also depicted on FIG. 13, server 1306 is coupled to a server storage device 1308, which includes a data volume such as cluster shared volume. Server storage device 1308 can be implemented as a single storage device or a collection of storage devices. Server storage device 1308 can also be implemented as a storage area network, which couples remote storage devices to a server (e.g., server 1306), such that the remote storage devices appear as locally-attached storage devices to the server's OS, for example.

In light of the present disclosure, those of skill in the art will appreciate that server storage device 1308 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 1300 can include other components such as routers, firewalls and the like that are not germane to the discussion of the present network and will not be discussed further herein. Those of skill in the art will also appreciate that other configurations are possible. For example, clients 1302(1)-(N) can be directly coupled to server storage device 1308 without the user of a server or Internet; server 1306 can be used to implement both the clients and the server; network architecture 1300 can be implemented without the use of clients 1302(1)-(N); and so on.

As an example implementation of network architecture 1300, server 1306 (implemented with a server 104) services requests to data generated by clients 1302(1)-(N) to data stored in server storage device 1308 (implemented with third-party storage 110). Other servers (not depicted) can be implemented with server 104. A server module (e.g., server module 114) can be implemented using one of the other servers in the manner illustrated by FIGS. 2, 3, and 11.

Figure 14:
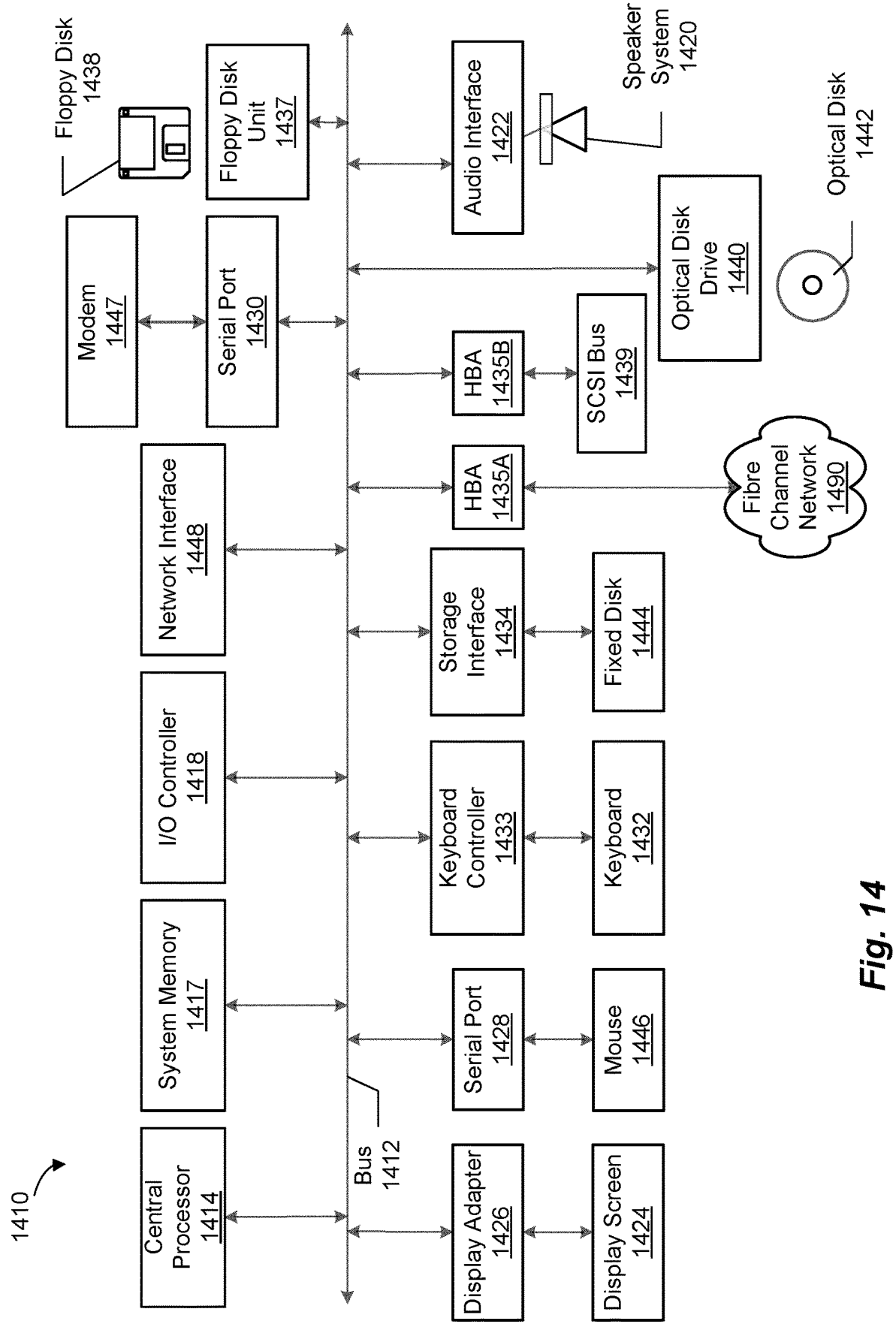
FIG. 14 is a block diagram that illustrates an example of a computer system suitable for implementing embodiments of the present invention.

FIG. 14 depicts a block diagram of a computer system 1410 suitable for implementing the present disclosure. Computer system 1410 may be illustrative of various computer systems in distributed computing system 100, such as server(s) 104 or nodes 112(1)-112(N), among others. Computer system 1410 includes a bus 1412 which interconnects major subsystems of computer system 1410, such as a central processor 1414, a system memory 1417 (typically RAM, but which may also include ROM, flash RAM, or the like), an input/output controller 1418, an external audio device, such as a speaker system 1420 via an audio output interface 1422, an external device, such as a display screen 1424 via display adapter 1426, serial ports 1428 and 1430, a keyboard 1432 (interfaced with a keyboard controller 1433), a storage interface 1434, a floppy disk drive 1437 operative to receive a floppy disk 1438, a host bus adapter (HBA) interface card 1435A operative to connect with a Fibre Channel network 1490, a host bus adapter (HBA) interface card 1435B operative to connect to a SCSI bus 1439, and an optical disk drive 1440 operative to receive an optical disk 1442. Also included are a mouse 1446 (or other point-and-click device, coupled to bus 1412 via serial port 1428), a modem 1447 (coupled to bus 1412 via serial port 1430), and a network interface 1448 (coupled directly to bus 1912).

Bus 1412 allows data communication between central processor 1414 and system memory 1417, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1410 are generally stored on and accessed via a computer readable medium, such as a hard disk drive (e.g., fixed disk 1444), an optical drive (e.g., optical disk drive 1440), a floppy disk unit 1437, or other storage medium. Additionally, applications can be in the form of electronic signals modulated in accordance with the application and data communication technology when accessed via network modem 1447 or interface 1448.

Storage interface 1434, as with the other storage interfaces of computer system 1410, can connect to a standard computer readable medium for storage and/or retrieval of information, such as a fixed disk drive 1444. Fixed disk drive 1444 may be a part of computer system 1410 or may be separate and accessed through other interface systems. Modem 1447 may provide a direct connection to a remote server via a telephone link or to the Internet via an internet service provider (ISP). Network interface 1448 may provide a direct connection to a remote server via a direct network link to the Internet via a POP (point of presence). Network interface 1448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 14 need not be present to practice the present disclosure. The devices and subsystems can be interconnected in different ways from that shown in FIG. 14. The operation of a computer system such as that shown in FIG. 14 is readily known in the art and is not discussed in detail in this application. Code for server module 114, agent(s) used by node(s) 112(1)-112(N) and/or for providing use of a distributed computing system (such as described above with reference to methods described by FIGS. 5, 6, 7, 8, and/or 9 and/or the block diagrams 310, and/or 1100), etc., to implement the present disclosure can be stored in computer-readable storage media such as one or more of system memory 1417, fixed disk 1444, optical disk 1442, or floppy disk 1438. Memory 1420 is also used for storing temporary variables or other intermediate information during the execution of instructions by the processor 1410. The operating system provided on computer system 1410 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments (including the Appendix), the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   creating a container logic structure in a memory device that includes an identification of processor resources required for a software application;
   receiving a first encoded instruction at a head node processor,
      wherein the first encoded instruction causes the head node processor to identify a plurality of compute node processors,
      to generate a second encoded instruction for each compute node processor of said plurality of compute node processors and
      to transmit the second encoded instruction to each compute node processor over a data communications medium;
   receiving the second encoded instruction at said each compute node processor and executing the container logic structure at said each compute node processor to generate output data; and
   receiving the output data from said each compute node processor at the head node processor.

2. The method of claim 1 wherein the head node processor assembles the output data from said each compute node processor into a job output package data structure.

3. The method of claim 2 wherein the first encoded instruction defines one or more requirements for the job output package data structure.

4. The method of claim 1 wherein executing the container logic structure at said each compute node processor comprises generating a network address for each container logic structure executing at said each compute node processor.

5. The method of claim 1 wherein executing the container logic structure at each said compute node processor comprises generating a security mechanism for each container logic structure executing at said each compute node processor.

6. The method of claim 1 wherein executing the container logic structure at said each compute node processor comprises receiving the container logic structure at said each compute node processor and executing the container logic structure after it has been received.

7. The method of claim 1 wherein the container logic structure comprises
   configuration files and parameters for the software application.

8. A method comprising:
   creating a container logic structure in a memory device using a processor, wherein the container logic structure includes an identification of processor resources required for a software application;
   receiving a first task at a head node processor,
      wherein the first task causes the head node processor to identify a plurality of compute node processors,
      to generate a second task for each of the plurality of compute node processors and
      to transmit the second task to each of the plurality of compute node processors over a data communications medium;
   receiving the second task at each of the plurality of compute node processors and executing the container logic structure at each of the pluraliy of compute node processors to generate output data; and
   receiving the output data from each of the plurality of compute node processors at the head node processor.

9. The method of claim 8 wherein the head node processor assembles the output data from each of the plurality of compute node processors into a job output package data structure defined by the software application.

10. The method of claim 9 wherein the first task defines one or more requirements for the job output package data structure to be generated by the software application using the container logic structure.

11. The method of claim 8 wherein executing the container logic structure at each of the plurality of compute node processors comprises receiving the container logic structure and generating a network address for each container logic structure executing at each of the pluraliy of compute node processors.

12. The method of claim 8 wherein executing the container logic structure at each of the plurality of compute node processors comprises generating a security mechanism for each container logic structure executing at each of the plurality of compute node processors.

13. The method of claim 8 wherein executing the container logic structure at each of the plurality of compute node processors comprises receiving the container logic structure at each of the plurality of compute node processors and executing the container logic structure after it has been received.

14. The method of claim 8 wherein the container logic structure comprises configuration files and parameters for the software application.

15. A system of data processing devices comprising:
   a first processor configured to create a container logic structure in a memory device that includes an identification of processor resources required for a software application;

a head node processor configured to receive a first encoded instruction,
  wherein the first encoded instruction causes the head node processor to identify a plurality of compute node processors,
  to generate a second encoded instruction for each compute node processor of the plurality of compute node processors and
  to transmit the container logic structure and the second encoded instruction to said each compute node processor over a data communications medium;
said each compute node processor configured to receive the second encoded instruction and to execute the container logic structure to generate output data; and
the head node processor configured to receive the output data from said each compute node processor.

16. The system of claim 15 wherein the head node processor assembles the output data from said each compute node processor into a job output package data structure.

17. The system of claim 16 wherein the first encoded instruction defines one or more requirements for the job output package data structure.

18. The system of claim 15 wherein said each compute node processor is configured to generate a network address for each executing container logic structure.

19. The system of claim 15 wherein said each compute node processor is configured to generate a security mechanism for each executing container logic structure.

20. The system of claim 15 wherein said each compute node processor is configured to receive the container logic structure and to execute the container logic structure after it has been received.

* * * * *